(No Model.)
F. M. LYTE.
PRODUCTION OF CAUSTIC ALKALIES AND CHLORINE.
No. 481,407. Patented Aug. 23, 1892.
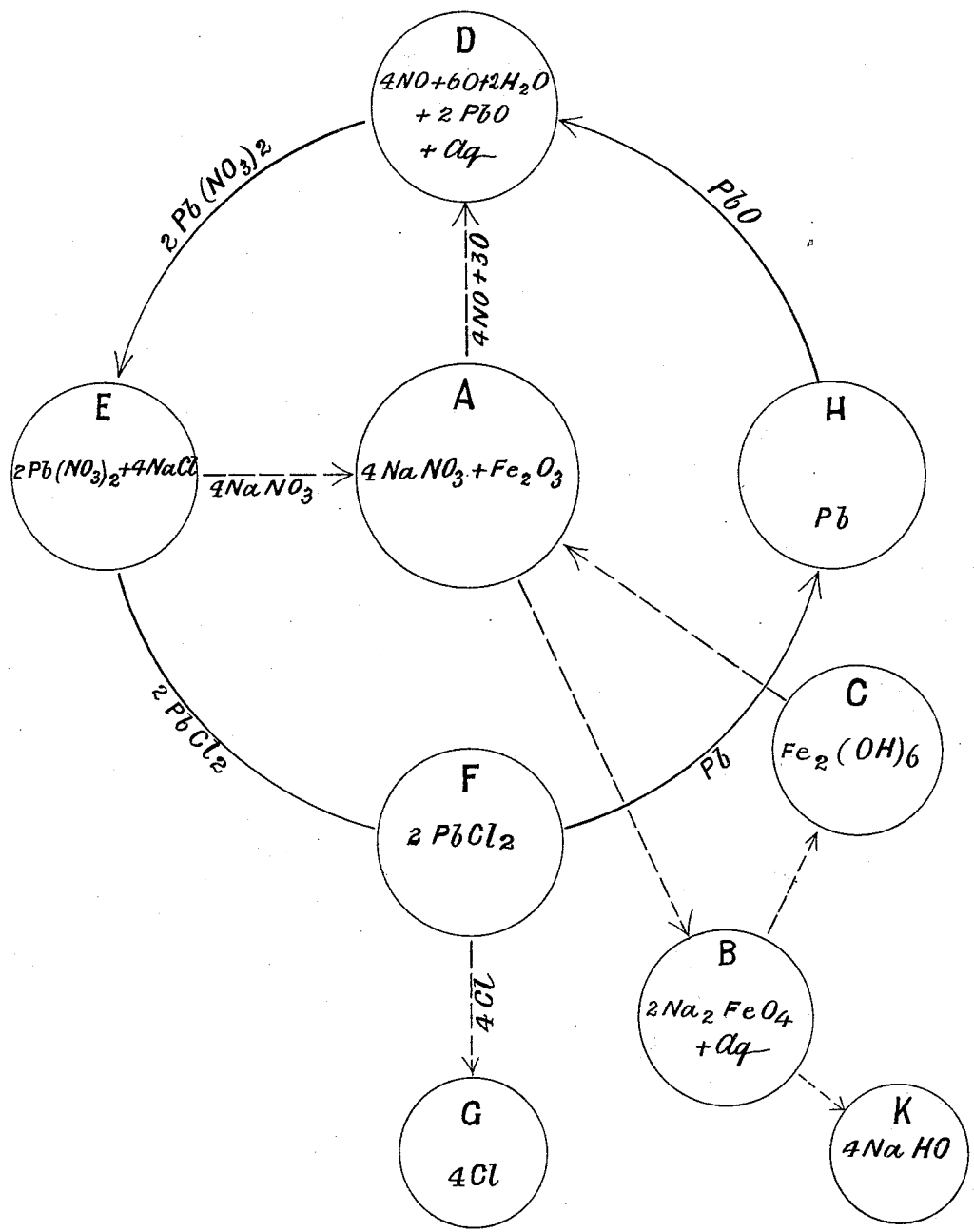

UNITED STATES PATENT OFFICE.

FARNHAM MAXWELL LYTE, OF LONDON, ENGLAND.

PRODUCTION OF CAUSTIC ALKALIES AND CHLORINE.

SPECIFICATION forming part of Letters Patent No. 481,407, dated August 23, 1892.

Application filed July 30, 1891. Serial No. 401,139. (No specimens.)

*To all whom it may concern:*

Be it known that I, FARNHAM MAXWELL LYTE, analytical chemist, of 60 Finborough Road, London, England, have invented new and useful Improvements in the Production of Caustic Alkalies and Chlorine, of which the following is a full, clear, and exact description.

This invention relates to an improvement in the conjoint process of continuously producing caustic alkalies and chlorine described in my previous patent, No. 462,567, filed the 28th day of April, 1891, Serial No. 390,833. In that process an alkaline nitrate is decomposed by heating it with calcic carbonate; and the object of the present invention is to more effectually decompose the nitrate, (so as to obtain a higher yield of nitric acid for use in the process,) to produce caustic alkali, and to diminish or entirely avoid the corrosion of the decomposing-pan when made of iron. This I effect by substituting ferric oxide for calcic carbonate as the reagent by which the decomposition of the nitrate is effected. Apart from this substitution of one decomposing reagent for another and the continual regeneration of the reagent used, the cycle of operations, so far as it relates to the production of chlorine and the continual regeneration of the alkaline nitrate, is the same as previously described in my aforesaid patent, the description of the whole cycle being here repeated only for the sake of making the whole process clear.

The process is applicable for treating either sodic or potassic nitrate, and I will take the former as a typical example. Commencing then at A in the accompanying diagram, sodic nitrate mixed with ferric oxide is heated until decomposition of the nitrate and the evolution of nitric oxide and oxygen together, leaving a residue, which when boiled with water will give a solution of caustic soda free from iron and a precipitate of hydrated ferric oxide. This residue goes to B and is there to be decomposed, as above mentioned, by lixiviation, preferably with boiling into caustic soda, (free from iron,) which goes to K, and ferric hydrate, which goes to C. The nitric oxide and oxygen are by the addition to them of air and water or oxygen and water to be converted in the usual way into aqueous nitric acid, and which is to be used to dissolve litharge or massicot, as shown at D, the resulting plumbic nitrate being then precipitated as plumbic chloride by sodic (or potassic) chloride, as at E. The plumbic chloride having been washed and dried is to be fused and decomposed electrolytically at F, (as described in the specification of my aforesaid previous patent,) the chlorine going to G, while metallic lead goes to H to be oxidized in the usual way for regeneration of lead oxide to be used again at D, as before. As, however, the metallic lead thus obtained by electrolysis may be got in an exceptionally-pure state, and as refined lead is of greater commercial value than unrefined lead, this pure lead may be profitably withdrawn from circulation and be replaced by a like quantity of ordinary pig-lead, which is equivalent for the purposes of making massicot in the usual way to continuing the process with the same lead. The sodic nitrate which was formed at E (at same time as the plumbic chloride, above mentioned) is recovered by evaporation for use over again at A, along with ferric oxide recovered by heating the ferric hydrate at C. It is possible that in the above reaction there is formed a certain portion of potassic or sodic ferrite, as the case may be; but the presence of the ferric oxide almost or wholly prevents its formation, and this complication is disregarded in the following equations, which are intended to represent the reactions essential to the process of my invention.

The reactions may be thus formulated:

First. $4NaNO_3 + Fe_2O_3 = 2Na_2FeO_4 + 4NO + 3O$.

Second. Boil the $2Na_2FeO_4$ with water.
$2Na_2FeO_4 + 5H_2O = 4NaHO + Fe_2(OH)_6 + 3O$.

Third. Heat the ferric hydrate.
$Fe_2(OH)_6 = Fe_2O_3 + 3H_2O$.

Fourth. Add to the $4NO + 3O$ oxygen and water.
$4NO + 6O + 2H_2O = 4HNO_3$.

Fifth. Add $2PbO$.
$4HNO_3 + 2PbO = 2Pb(NO_3)_2 + 2H_2O$.

Sixth. Decompose the $2Pb(NO_3)_2$ with $4NaCl$.
$2Pb(NO_3)_2 + 4NaCl = 2PbCl_2 + 4NaNO_3$.

The $2PbCl_2$ on being decomposed electrolytically yields $2Pb$ and $4Cl$.

Having now particularly described and ascertained the nature of the said invention and in what manner the same is to be performed, I declare that what I claim is—

The herein-described conjoint process of continuously producing caustic alkali and chlorine, which consists in decomposing an alkaline nitrate by heating it with ferric oxide to evolve nitrous fumes, decomposing the residue by boiling with water into caustic alkali free from iron and a precipitate of ferric hydrate, converting the nitrous fumes into aqueous nitric acid, dissolving plumbic oxide therein, precipitating plumbic chloride, fusing it, and decomposing it electrolytically into chlorine and metallic lead, and finally converting this (or any other) lead into plumbic oxide and the ferric hydrate into ferric oxide for recommencing the cycle, all as specified.

The foregoing specification of my improvements in the production of caustic alkalies and chlorine signed by me this 16th day of July, 1891.

FARNHAM MAXWELL LYTE.

Witnesses:
BESSIE TONGE,
60 *Finborough Road, Fulham Road, London, Domestic Servant.*
WILMER M. HARRIS,
*Notary Public,* 17 *Gracechurch Street, London.*